(12) United States Patent
Canning et al.

(10) Patent No.: US 7,379,645 B2
(45) Date of Patent: May 27, 2008

(54) OPTICAL FIBER WITH FRESNEL DIFFRACTION

(75) Inventors: John Canning, Carlton (AU); Kristy Lee Sommer, Runcorn (AU); Shane Huntington, Parkville (AU)

(73) Assignees: The University of Melbourne, Parkville, VIC (AU); The University of Sydney, Sydney, NSW (AU)

( * ) Notice: Subject to any disclaimer, the term of this patent is extended or adjusted under 35 U.S.C. 154(b) by 390 days.

(21) Appl. No.: 10/466,442

(22) PCT Filed: Jan. 18, 2002

(86) PCT No.: PCT/AU02/00058

§ 371 (c)(1),
(2), (4) Date: Nov. 4, 2003

(87) PCT Pub. No.: WO02/057820

PCT Pub. Date: Jul. 25, 2002

(65) Prior Publication Data

US 2004/0091222 A1    May 13, 2004

(30) Foreign Application Priority Data

Jan. 19, 2001  (AU) .................................. PR 2626

(51) Int. Cl.
*G02B 6/02*     (2006.01)
*G02B 6/028*    (2006.01)
*G02B 6/036*    (2006.01)
*G02B 3/00*     (2006.01)

(52) U.S. Cl. ...................... 385/123; 385/33; 385/124; 385/127; 359/652

(58) Field of Classification Search ............... None
See application file for complete search history.

(56) References Cited

U.S. PATENT DOCUMENTS

| 3,980,459 | A | | 9/1976 | Li |
| 4,292,341 | A | | 9/1981 | Marcuse et al. |
| 4,645,523 | A | | 2/1987 | Howard et al. |
| 4,715,679 | A | * | 12/1987 | Bhagavatula ............ 385/127 |
| 4,936,889 | A | | 6/1990 | Greenham et al. |
| 5,579,427 | A | | 11/1996 | Rusanov et al. |

FOREIGN PATENT DOCUMENTS

GB     2242755    10/1991

* cited by examiner

*Primary Examiner*—Hemang Sanghavi
*Assistant Examiner*—Omar Rojas
(74) *Attorney, Agent, or Firm*—Ladas & Parry LLP (57) ABSTRACT

An optical fiber being optically transmissive at a predetermined wavelength of light $\lambda$ and comprising a plurality of coaxial layers. Each layer having an optical path length that varies radially, the coaxial layers being arranged to give the fiber a refractive index profile which, in use, causes sufficient Fresnel diffraction of the light such that it is guided in the fiber. The refractive index of a cladding region (60) is intermittently suppressed by controlling heating of the preform tube, thus forming a chirped saw-tooth profile (70). The optical fiber may include a lens. In this case, each of the layers has an optical path length that increases gradually outwardly by substantially $n \times \lambda/2$ (n: integer).

31 Claims, 9 Drawing Sheets

OPTICAL FIBER WITH FRESNEL DIFFRACTION

FIELD OF THE INVENTION

The present invention relates to an optical fibre.

BACKGROUND OF THE INVENTION

Practical lenses for fibres are usually small optical ball lenses which are commercially available. However, despite their compact size they are still relatively large compared to the fibre, which presents a number of alignment difficulties when incorporated into integrated systems. Tedious methods of fabricating such lenses include polishing and melting the fibre end, although the results are most often less than desirable.

There is therefore a need for micro-optical lenses for optical fibres that are commensurate with the fibre dimensions and are easier to align. Ideally the lenses should be low-cost.

SUMMARY OF THE INVENTION

In accordance with a first aspect of the present invention, there is provided an optical fibre being optically transmissive at a predetermined wavelength of light $\lambda$ and comprising a plurality of coaxial layers, each having an optical path length that varies radially, the coaxial layers being arranged to give the fibre a refractive index profile which, in use, causes sufficient Fresnel diffraction of the light such that it is guided in the fibre.

In a preferred embodiment of the present invention the optical fibre includes a lens. In this case each of the layers has an optical path length that increases gradually outwardly by substantially $n \times \lambda/2$ (n: integer) the layers being radially distributed such that, in use, the fibre effects sufficient Fresnel diffraction such that the light is guided in the fibre and then passes out an end-face of the fibre, is focused substantially at a predetermined focal point.

Prior art Fresnel lenses are generally compact and lightweight alternatives to conventional imaging lenses since the bulk of the conventional lens material is unnecessary. However, it is not known in the prior art to design a Fresnel lens small enough for use with an optical fibre. The lens structure of the present invention allows a Fresnel lens to be made with the same dimensions as an optical fibre.

A Fresnel lens is normally characterised by a series of Fresnel zones in the form of concentric annuli with a steadily decreasing radius such that the area of each Fresnel zone is approximately constant. In accordance with the preferred embodiment of the present invention, the Fresnel zones are formed by the coaxial layers. This design may be used to ensure that there is constructive interference of each wavelet originating from the boundary of each Fresnel zone. A Fresnel lens can be used to collimate light by designing a lens such that the point of focus is at an infinite distance.

The optical path length in each coaxial layer in accordance with the first aspect of the present invention preferably is graded. For example, the optical path length in each layer may increase linearly with radial distance from the axis of the fibre. In case of the preferred embodiment of the present invention, the difference in optical path length between adjacent layers is at a maximum (i.e. $\lambda/2$, equivalent to a $\pi$ phase difference) at the interface between the layers. The end-face of the optical fibre in accordance with the preferred embodiment may also be coupled to a long period grating such that, in use, the light passes out of the lens and through the long period grating. It is known that focusing properties may be improved by adding a long period grating. Adjacent coaxial layers may differ in refractive index to an extent sufficient to create the difference in optical path lengths (whether graded or stepped). The coaxial layers preferably have graded refractive indices which together produce a refractive index profile in the form of a chirped saw-tooth waveform, the period of which decreases radially outwardly. Alternatively, the end-face of the fibre may be spatially-profiled to an extent sufficient to create the required difference in optical path lengths between adjacent layers. For example, the end-face may have a chirped saw-tooth profile decreasing in period with radial distance from the axis of the fibre. The difference in optical path lengths between adjacent layers preferably is a result of a combination of refractive index differences between adjacent layers, and a spatial profile of the end-face. For example, the difference in refractive index between adjacent coaxial layers may produce optical path lengths differences which are less than required and the spatially-profiled end-face may compensate to produce the required difference.

The lens in accordance with the preferred embodiment of the present invention may have a focal length f within the range $0<f<\infty$. The focal length may be tunable by tuning the refractive index of a medium which is in contact with the end-face of the fibre. The medium preferably is a liquid crystal. Alternatively, the fibre may comprise means for applying heat or mechanical energy to the fibre which can be used to tune the focal length. As another alternative, at least some of the layers may be composed of an electro-optical active material which may change its refractive index when a voltage is applied. The fibre may comprise means for applying the voltage to the layers and the focal length may be tunable by tuning the applied voltage.

The lens may also form a part of an optical actuator. Further, the lens may form a part of an optical filter. The lens has optimised properties for a wavelength range about $\lambda$. Therefore, wavelength outside this range, for example related to modes of different orders, can be filtered out by the lens. The filter may be a tunable bandpass filter. The wavelength range that is filtered may be selected by tuning the focal length of the lens.

The lens may also form a part of a fibre butt-coupler for coupling two fibres which may have different core and/or mode profile dimensions. Further, the lens may form a part of a device for remote Raman sensing.

The lens may form a part of a wavelength selective coupler. As the focal length of the lens is wavelength dependent, the lens can be used to couple wavelength selectively light into another fibre after it passes out of the end-face. If the focal length of the lens is tunable, the lens may form a part of a tunable wavelength selective coupler.

The lens may be one of a plurality of lenses forming an array of lenses.

The lens may also be combined with a graded refractive index (GRIN) lens. In this case the optical zones are adapted to support the focusing properties of the GRIN lens.

The optical fibre in accordance with the first aspect of the present invention may be formed from a silica-based material doped with a refractive index-modifying dopant, such as phosphate ($P_2O_5$) or germanate ($GeO_2$). Tin oxide (SnO) may be even more suitable because of higher its volatility. Alternatively, the optical may be formed from a polymeric material. The optical fibre may comprise a core region surrounded by the coaxial layers. The coaxial layers may also function as a cladding by having an average refractive index which is lower than the core refractive index. A refractive index-reducing dopant may be included in the coaxial layers to reduce the average refractive index, such as fluorine in the form of a fluorophosphate.

The optical fibre preferably is spliceable to a standard optical fibre.

In accordance with a second aspect of the present invention, there is provided a method of forming an optical fibre comprising the steps of:

providing a member having an axis;

depositing a plurality of coaxial layers on the member, each of the layers being composed of a material that is optically transmissive at a predetermined wavelength $\lambda$ and being formed such that its optical path length varies across its thickness, the coaxial layers being arranged to give the fibre a refractive index profile which, in use, causes sufficient Fresnel diffraction of the light such that it is guided in the fibre.

The member in the above defined method may be in the form of a preform tube from which the fibre is drawn.

In another preferred embodiment of the present invention the above defined method comprises the step of forming a lens wherein, in use, the fibre effects sufficient Fresnel diffraction such that light of wavelength $\lambda$ that is guided in the fibre and then passes out an end-face of the fibre is focused substantially at a predetermined focal point. The method may also comprise the step of cutting the fibre to length L to form a lens of length L.

The method may further comprise the step of incorporating a dopant in the layers for controlling potential chemical etch rates of the respective layers. The dopant may also control the refractive indices of the respective layers. The concentration of the dopant may be graded across each layer. The dopant preferably acts to modify the refractive index and etch rate of each layer in proportion to the concentration of the dopant.

When a lens is formed, the method may further comprise the step of etching the end-face of the fibre with a chemical etchant having an etch rate which is proportional to the concentration of the dopant in the layers. The method may also comprise the step of incorporating a volatile dopant which initially modifies the refractive index and the etch rate of each layer and later volatilises. Alternatively, the method may comprise the step of writing a Fresnel lens structure into the end-face of the fibre using a lithographic process such as electron beam lithography and subsequent etching. It is known that electron beam lithography changes etch properties. The method may also comprise the step of initiating diffusion of dopants. This step may comprise the application of heat having a temperature gradient along the fibre. The temperature preferably is highest in or near a region corresponding to the end-face of the fibre.

In accordance with a third aspect of the invention, there is provided a method of forming a preform rod suitable for being drawn into an optical fibre, the method comprising the steps of:

passing a precursor vapour along a preform tube, the precursor vapour including a first precursor for depositing a first material inside the tube, and a second precursor for depositing a second, relatively more volatile, material inside the tube;

heating the preform tube so as to react the precursor and to progressively deposit the first and second materials inside the tube, the second material being distributed within the first material;

controlling the heating so that a concentration gradient of the second material is controlled by the desorption rate of the second material relative to a desorption rate of the first material.

In the prior art, the composition of a preform is controlled by controlling the flow rates of the various precursors. However, there is a time lag involved in changing the flow rates of precursor vapours. As a result, such prior art methods cannot produce the sharp changes in preform composition that are required to form a Fresnel lens or a Fresnel fibre. The third aspect of the present invention overcomes this problem by taking advantage of the fact that the desorption rate of deposited material can be changed relatively quickly and locally by altering the local tube heating rate.

The second material may be a dopant which modifies one or more of the following properties of the deposited material:

refractive index; and chemical etch rate.

Thus, the refractive index and/or chemical etch rate of the deposited material may be a function of the concentration of the second material in the deposited material.

The method may be used to form almost any cylindrically-symmetric concentration profile of the second material within the first material.

In accordance with a fourth aspect of the present invention there is provided a preform rod when fabricated in accordance with the third aspect of the present invention.

It is to be understood that, if any prior art publication is referred to herein, such reference does not constitute an admission that the publication forms a part of the common general knowledge in the art, in Australia or any other country Embodiments of the invention will now be described, by way of example only, with reference to the accompanying drawings.

DETAILED DESCRIPTION OF THE DRAWINGS

Figure 1:
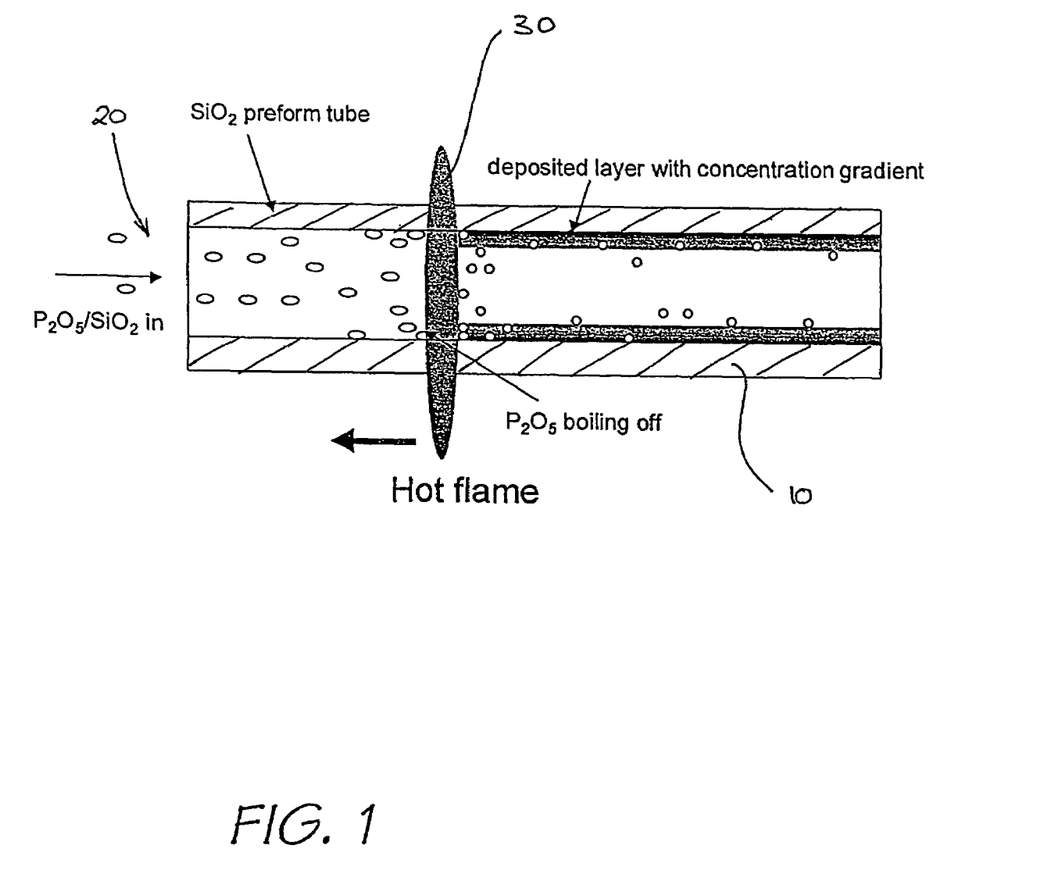
FIG. 1 illustrates a method of forming a preform rod in accordance with an embodiment of the present invention.

Referring to FIG. 1, a method of fabricating a preform rod suitable for being drawn into an optical fibre will be described. The preform may be used to form an optical fibre which guides light along its length by continuously diffracting light towards the central axis. Alternatively, the preform may be used to form a Fresnel lens which uses Fresnel diffraction to focus light. The fabrication method uses conventional modified chemical vapour deposition (MCVD) to deposit alternate layers within a silica preform tube 10. Preform vapours 20 flow through the tube 10 whilst the preform tube is heated with an external flame 30. In order to provide uniform heating, the tube 10 is rotated and the flame 30 is traversed along the length of the tube. It is known that the preform composition can be progressively modified as the layers are deposited by progressively changing the composition of the precursors. For example, the core of a silica-based optical fibre preform can be doped with germanium by simultaneously introducing a precursor which forms germanate ($GeO_2$). Thus, the thickness of each deposited layer can, to a limited extent, be determined by controlling the concentration of the associated precursor. However, the time lag involved in changing the concentration of a precursor flowing through the tube makes it difficult to produce the sharp changes in composition that are typically required in a Fresnel lens. Rather than relying on modulating the concentration of a precursor dopant to achieve a periodic structure, the method exploits differences in the volatilities of different deposited materials to modify the preform composition. In the example shown in FIG. 1, the preform being grown is a silica preform doped with phosphate ($P_2O_5$). The phosphate dopant has a higher volatility than silica. As the flame 30 transverses the preform tube 10, a fraction of all deposited material continuously desorbs i.e. evaporates at the leading edge of the transversing flame while new material is deposited, but the more volatile phosphate evaporates at a higher rate than the silica. Thus, by controlling the tube spin rate, tube temperature and duration of the heating, the composition of the growing preform can be controlled layer by layer to form the desired radial composition. The addition of fluorine or other dopants to the mixture controls the average refractive index of the layers and can enhance the process through diffusion of fluorine in the glass if the thermal exposures are long. In this example, the most volatile material is phosphate, although germanate also has a higher volatility and faster diffusion compared to silicate. However, it is to be understood that the process is not restricted to these materials. Higher index changes, for example, can be expected by incorporating metal oxides. Further, the method of diffusion and volatility is not limited to glass optical fibres but can be extended to other material systems.

FIGS. 2-6 show radial refractive index profiles of respective preform rods formed in accordance with the above method. Each of the refractive index profile include a saw tooth profile having a period which reduces with radial distance from the centre of the preform. In order to produce the saw tooth profiles, it is necessary to be able to generate sharp changes in dopant concentration.

Figure 2:
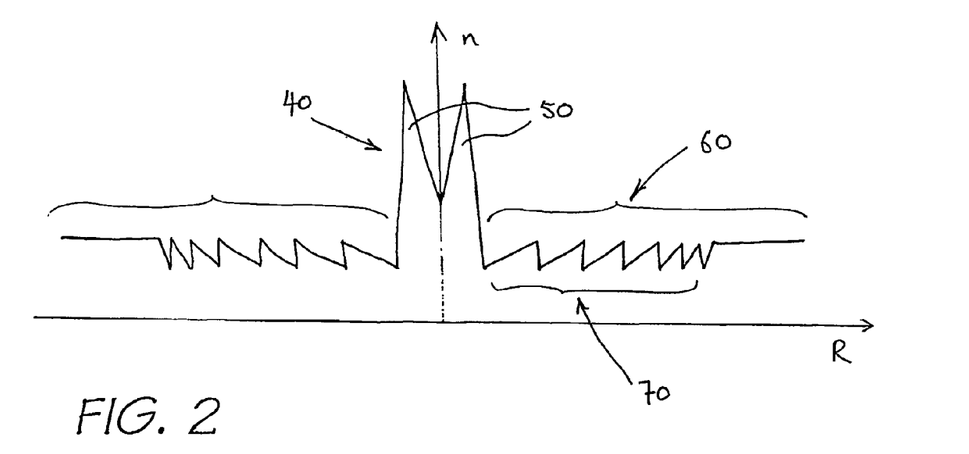
FIG. 2 shows a radial refractive index profile of a preform rod formed in accordance with an embodiment of the present invention.

The refractive index profile shown in FIG. 2 includes a core region 40 comprising two spikes 50 of increased refractive index, surrounded by a cladding region 60 of lower average refractive index. The refractive index of the cladding region 60 is intermittently suppressed by controlling heating of the preform tube, thus forming a chirped saw tooth profile 70. Despite the suppression of the refractive index in the saw tooth profile region, the average refractive index of the cladding region is substantially lower than that of the core, enabling light to be confined within the core. However, if the mode field diameter of a propagating beam is greater than the core diameter, the beam is still focussed by the Fresnel lens effect in the cladding region 60.

Figure 3:
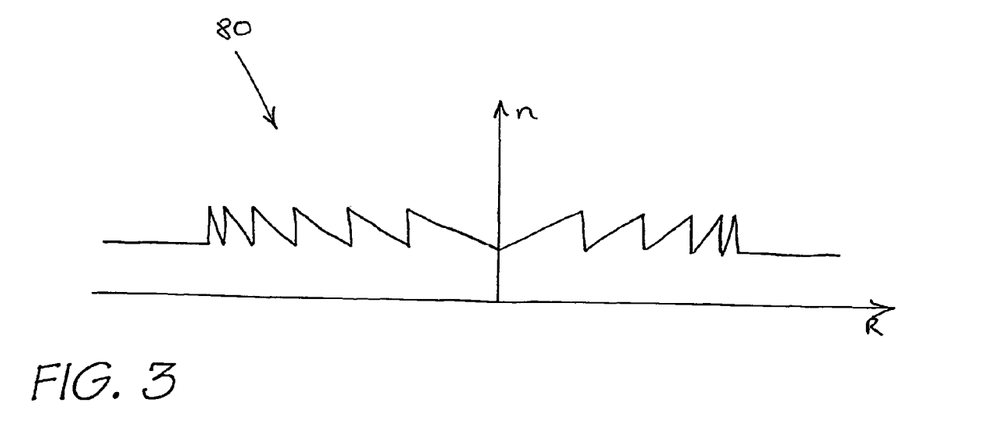
FIG. 3 shows a further refractive index profile of a preform rod formed in accordance with an embodiment of the present invention.

The refractive index profile shown in FIG. 3 is similar to that of FIG. 2, but does not include a core region. In this case, a saw tooth profile 80 is formed right across the centre of the preform.

Figure 4:
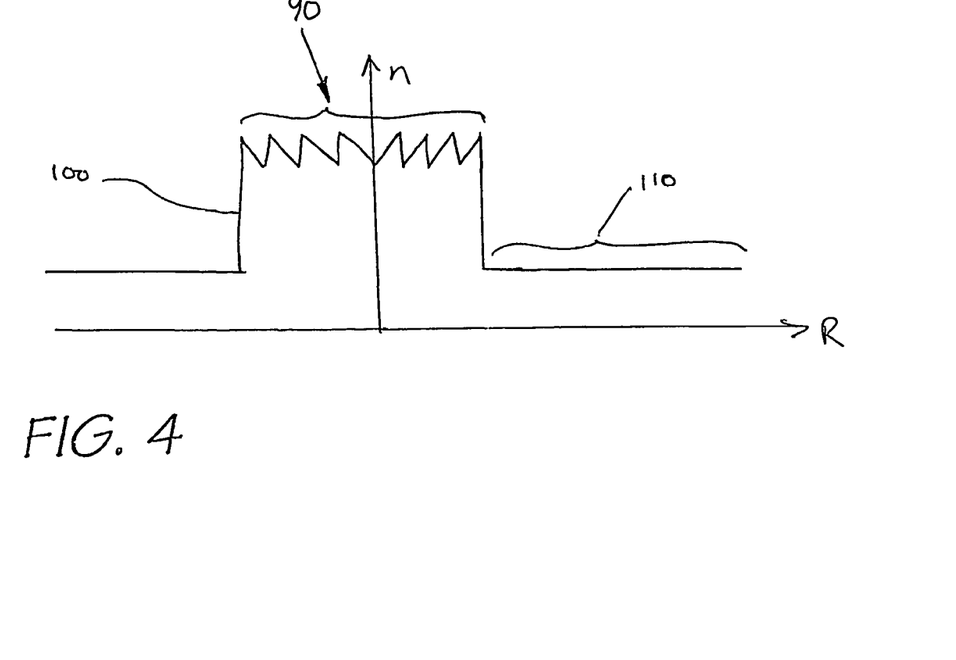
FIG. 4 shows a further refractive index profile of a preform rod formed in accordance with an embodiment of the present invention.
Figure 5:
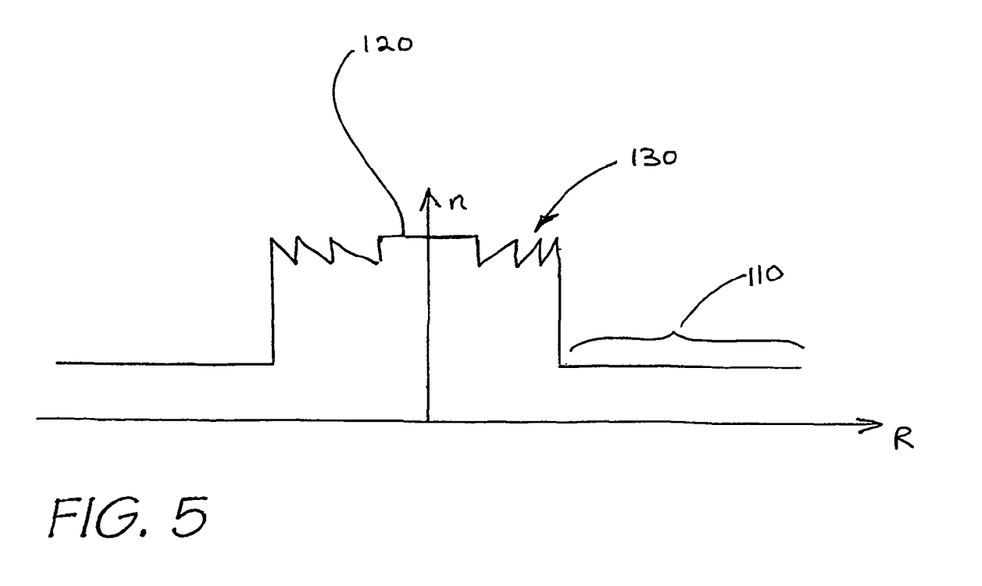
FIG. 5 shows a further refractive index profile of a preform rod formed in accordance with an embodiment of the present invention.
Figure 6:
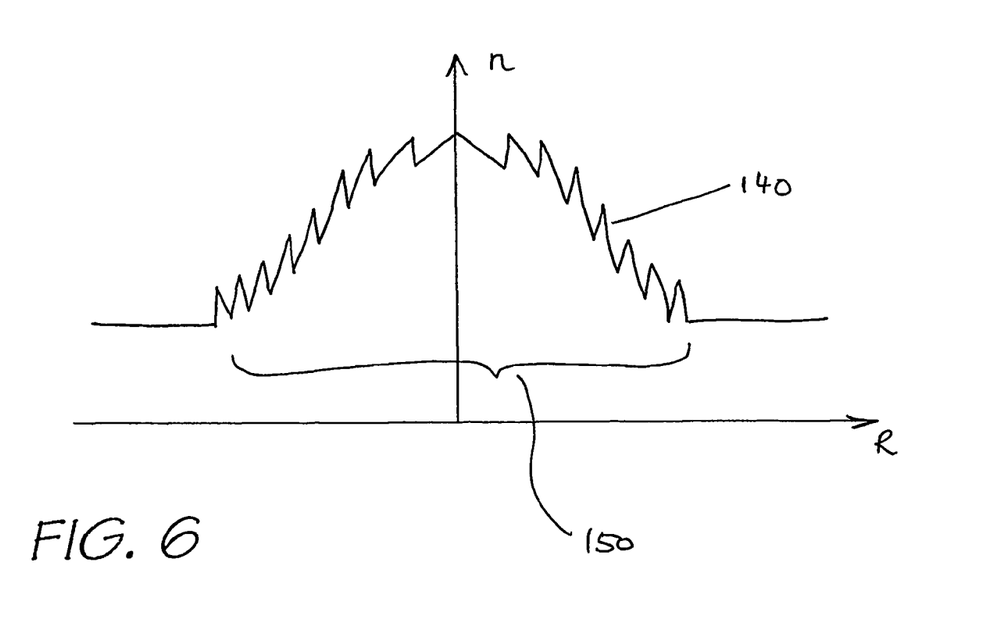
FIG. 6 shows a further refractive index profile of a preform rod formed in accordance with an embodiment of the present invention.

FIG. 4 shows a refractive index profile in which a chirped saw tooth profile 90 is superimposed on a stepped-index core profile 100 and surrounded by a cladding 110 of uniform refractive index. The stepped-index core profile 100 is formed by introducing a dopant, such as $GeO_2$, when depositing the core region, and the chirped saw tooth profile 90 is formed by modulating the heat applied to the preform tube as the core is deposited. The refractive index profile shown in FIG. 5 is similar to that of FIG. 4, but includes a region of uniform refractive index 120 at the centre of the core saw tooth profile 130. FIG. 6 shows a refractive index profile in which a saw tooth profile 140 is superimposed on a graded index core profile 150.

Figure 7:
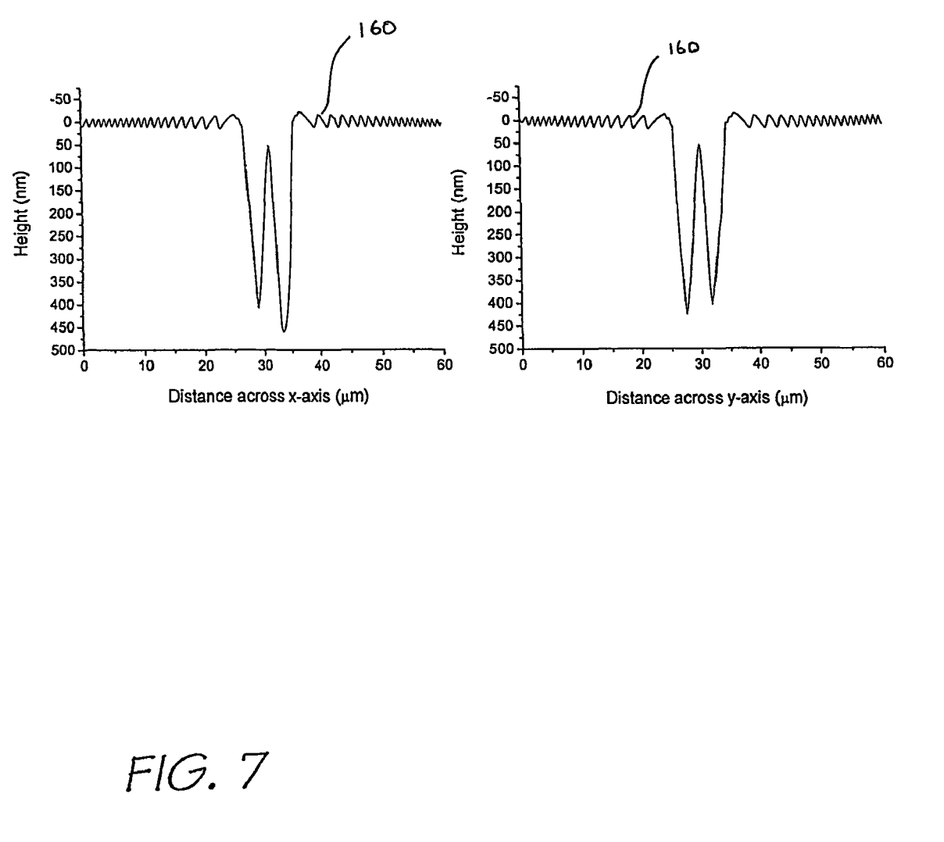
FIG. 7 shows x- and y-axis height profiles across a lens at an end-face of an optical fibre which has been formed in accordance with an embodiment of the present invention by drawing a preform and chemically etching the end-face of the drawn fibre.
Figure 8:
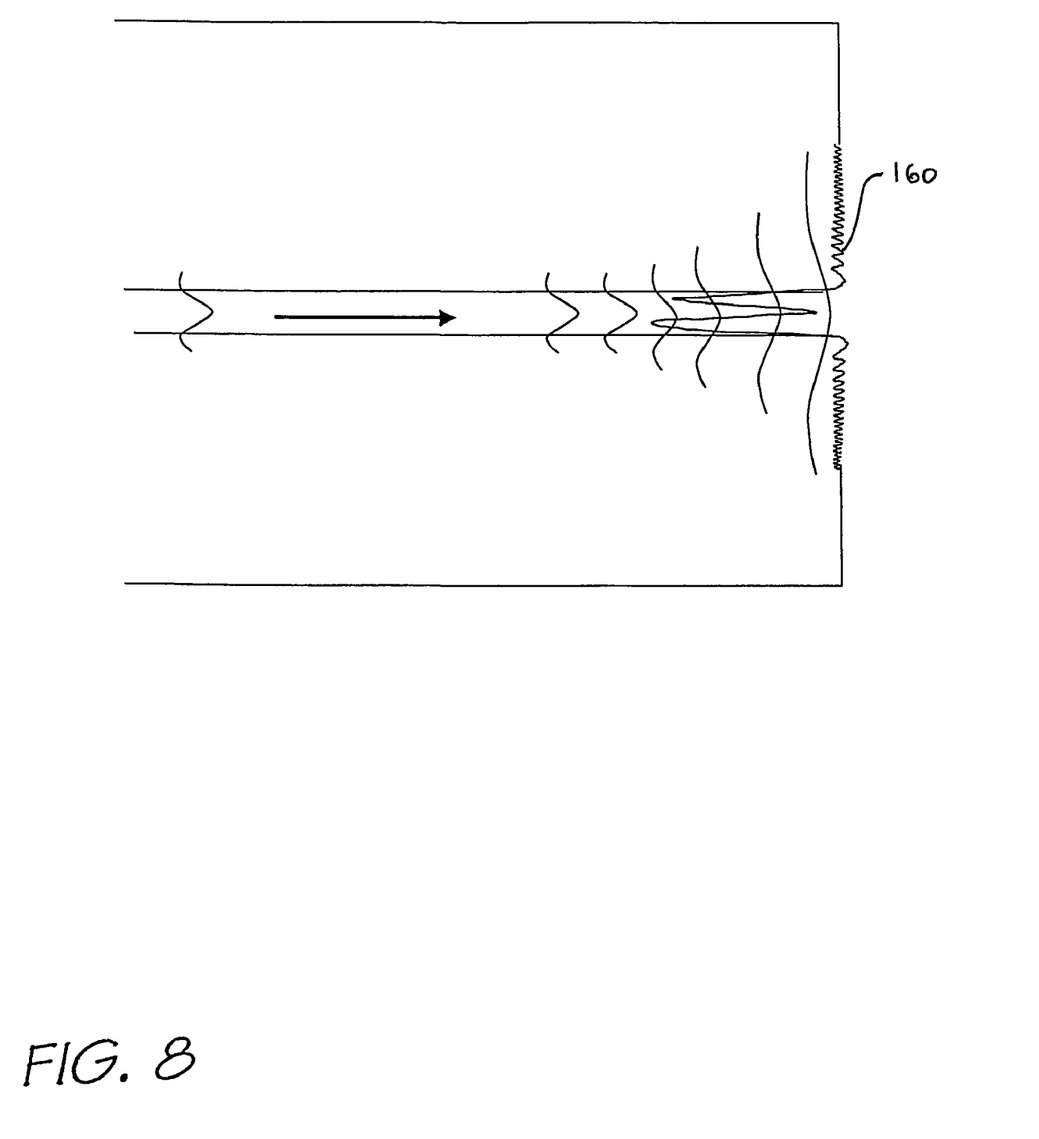
FIG. 8 shows changes in a mode field as it propagates along an optical fibre core towards a Fresnel lens formed an end-face of the fibre.
Figure 9:
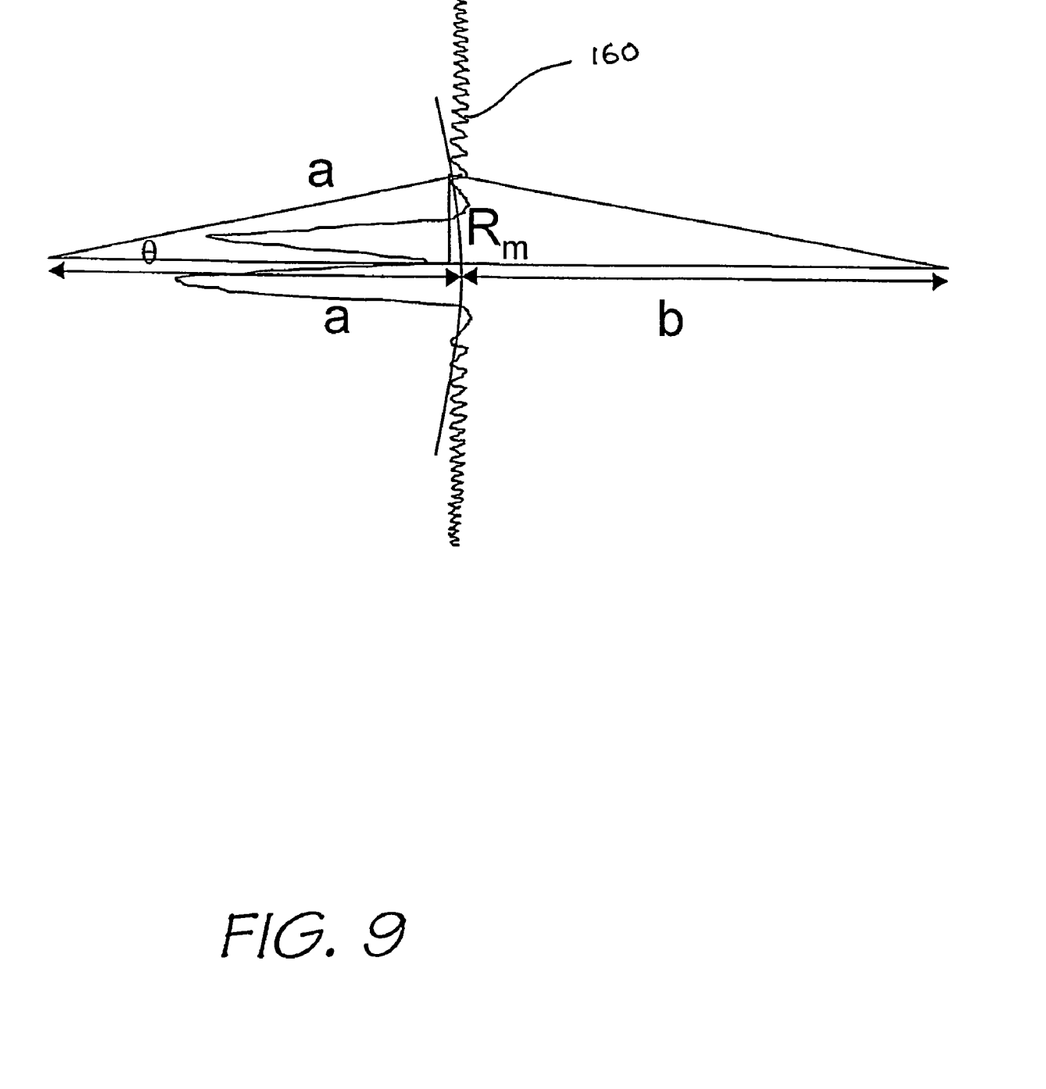
FIG. 9 illustrates the geometric lens equivalent of a Fresnel lens.

An embodiment of an all-fibre Fresnel lens formed on an optical fibre drawn from a preform rod will now be described with reference to FIGS. 7-9. The optical fibre was drawn from a preform rod having a phosphosilicate core with an inner cladding of fluorophosphosilicate prepared using the method described above.

In all, twenty layers were deposited with decreasing period away from the fibre core. This fibre was multi-moded at short wavelengths and supported two modes at 1.5 μm although with care it was possible to launch mostly into the fundamental mode at longer wavelengths. The fibre end was then etched for ~3 minutes in buffered HF. The resultant end-face topography was subsequently characterised using a Digital Instruments Atomic Force Microscope (AFM) (model—Dimension 3100). FIG. 7 shows x and y axis height profiles across the etched end-face of the fibre. The annuli distributed in the characteristic fashion of a Fresnel lens are clearly visible. The cross-section in the x and y directions show the profile of the lens teeth 160 and the gradient is now of opposite sign to that seen in the refractive index profile indicating that the concentration of $P_2O_5$ has decreased during preform fabrication as expected. After etching the chirped profile is typical of that expected for a Fresnel lens. However, in addition there is a decreasing and tapered effective NA as the Fresnel zones are approached by a propagating mode due to the large etched core region. Therefore, the profile of the mode at the Fresnel zones resembles more closely the spherical distribution of a point source and the field overlap is larger than would otherwise be. This is schematically illustrated in FIG. 8. The taper can be achieved by means other than etching, such as thermally-driven diffusion or it can be left out altogether with an appropriate inner cladding design.

Assuming that the dimensions are exact and the propagating light field closely resembles that of a spherical wave at the zones, some of the properties of an all-fibre Fresnel lens can be calculated using standard theory. FIG. 9 shows the geometric lens equivalent of the Fresnel lens. From lens theory it is easily shown that the required wavelength relationship and the Fresnel zone radius, $R_m$ are related to a and b as:

$$\frac{m\lambda}{2n} = \frac{R_m^2}{2}\left(\frac{1}{a} + \frac{1}{b}\right)$$

where n is the effective glass/air index and m is the zone number. For an optical fibre the maximum divergence angle can be assumed to be the critical angel of propagation:

$$\theta_c = \cos^{-1}\frac{n_{cl}}{n_{co}}$$

Where $n_{cl}$ (~1.450) and $n_{co}$ (~1.458) are the cladding and core indices respectively. Noting that $a=R_m/\sin\theta$, and rearranging, the effective focal length, b, is:

$$b = \left|\frac{nR_m^2}{m\lambda - nR_m\sin\left[\cos^{-1}\left(\frac{n_{cl}}{n_{co}}\right)\right]}\right|$$

In this equation, when the bottom term is zero, the lens acts as a collimator. Since we have a complicated core-cladding profile as the Fresnel zones are approached, an effective $n_{co}$ has to be determined. Therefore, assuming perfect lens fabrication, the wavelength at which the light is collimated is ~870 nm with a core/cladding index difference of 0.008. With an effective core/cladding index difference of about half this at the lens, the wavelength is ~520 nm. Clearly, the above theory is qualitative and a more rigorous approach is required for exact quantitative design.

Figure 10:
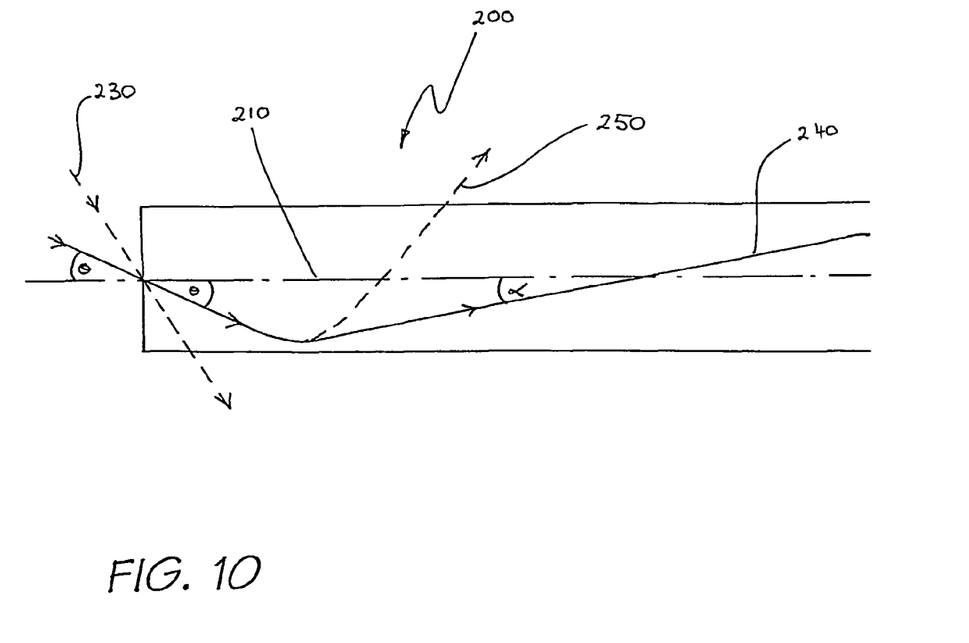
FIG. 10 is a ray trace diagram for an optical fibre in accordance with an embodiment of the invention.

Based on similar principles to the Fresnel lens, a fibre can be designed in which fibre propagation occurs by way of Fresnel diffraction. FIG. 10 shows a schematic ray trace diagram of a Fresnel fibre 200 in order to illustrate the light-guiding mechanism. The description presented here is a simple ray tracing analogy showing the condition for waveguide propagation through Fresnel diffraction. The description can be based on modal propagation solutions where the propagating modes are defined by the bounding Fresnel diffraction conditions. The Fresnel fibre has a chirped saw tooth refractive index profile (not shown) which decreases in period radially outwardly. As a beam of light travels along the fibre, differences in refractive index between adjacent coaxial layers gradually cause radial differences in optical path lengths to develop. If the optical path length in adjacent layers differs by $n \times \lambda/2$ (n: integer), the light is diffracted by angle α towards the central axis 210 of the fibre. If the light enters the fibre at an angle (relative to the central axis) which is greater than an acceptance angle θ, the light will not be diffracted sufficiently to be guided along the fibre. In this case, as shown in FIG. 10 by ray 230, the light beam will escape from the fibre 200. If the light beam enters the fibre at an angle less than the acceptance angle θ, the light will be focussed by Fresnel diffraction back toward the central axis of the fibre at angle α. Again, if the angle α is less than the acceptance angle θ (as shown by ray 240), the light beam will be re-diffracted back towards the axis, and thus will continue to be guided in the fibre. However, as shown by ray 250, if the angle α of the diffracted beam is greater than θ, the light cannot be re-diffracted sufficiently to be guided within the fibre. It is therefore necessary to design the refractive index profile such that the light is diffracted at angles less than or equal to the acceptance angle θ.

Figure 11:
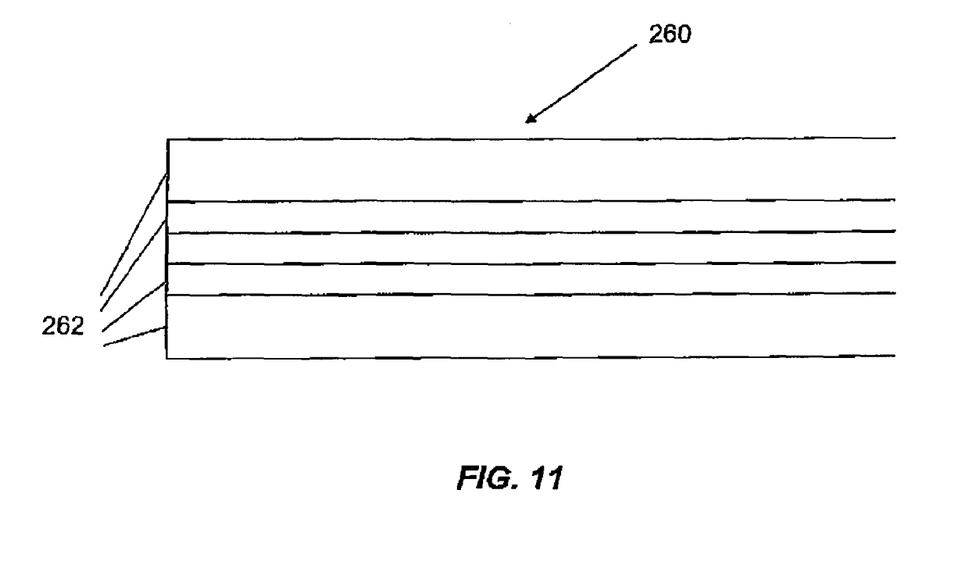
FIG. 11 shows a cross-sectional representation of an optical fibre in accordance with an embodiment of the invention.

FIG. 11 shows a schematic cross-sectional representation of an optical fibre 260 having a plurality of coaxial layers 262 that enable guiding of light by Fresnel diffraction.

It will be appreciated by a person skilled in the art that numerous variations and/or modifications may be made to the present invention as shown in the specific embodiment without departing from the spirit or scope of the invention as broadly described. The present embodiments are therefore to be considered in all respects illustrative and not restrictive.

The invention claimed is:

1. An optical fibre being optically transmissive at a predetermined wavelength of light λ and comprising a plurality of coaxial layers each having an optical path length that varies radially,
   an end-face; and
   a lens portion that includes at least a portion of the coaxial layers;
   wherein the coaxial layers are arranged to give the fibre a refractive index profile that causes sufficient Fresnel diffraction such that the light is guided in the fibre and diverted by the lens portion when passing out at the end-face.

2. The optical fibre as claimed in claim 1 wherein the optical path length of each of the layers is graded across its thickness.

3. The optical fibre as claimed in claim 1 wherein the lens portion has an optical path length of each of the layers that increases gradually outwardly by substantially $n \times \lambda/2$ (n: integer), the layers being radially distributed, such that in use, the fibre effects sufficient Fresnel diffraction such that the light that is guided in the fibre and then passes out an end-face of the fibre, is focused substantially at a predetermined focal point.

4. The optical fibre as claimed in claim 3 wherein adjacent of the coaxial layers differ in refractive index to an extent sufficient to create the required difference in optical path length.

5. The optical fibre as claimed in claims 3, wherein the end face of the fibre is spatially profiled to an extent sufficient to create the required difference in optical path length.

6. The optical fibre as claimed in claim 3, wherein the required difference between adjacent layers is a result of a combination of refractive index differences between adjacent layers and spatial profiling at the end face.

7. The optical fibre as claimed in claim 3 wherein the end-face is coupled to a long period grating such that, in use, the light passes out of the fibre and through the long period grating.

8. The optical fibre as claimed in claim 3 wherein the refractive index of each layer is graded and the layers together produce a refractive index profile in the form of a chirped saw-tooth waveform, the period of which decreases radially outwardly.

9. The optical fibre as claimed in claim 3 having a focal length f within the range $0<f<\infty$.

10. The optical fibre as claimed in claim 9 wherein the focal length is tunable by tuning the refractive index of a medium which is in contact with the end-face of the lens.

11. The optical fibre as claimed in claim 10 wherein the medium is a liquid crystal.

12. The optical fibre as claimed in claim 11 comprising means for applying beat to the lens to tune its focal length.

13. The optical fibre as claimed in claim 12 comprising means for applying mechanical energy to the lens to tune its focal length.

14. The optical fibre as claimed in claim 3 wherein at least some of the layers are composed of an electro-optical active material which changes its refractive index when a voltage is applied.

15. The optical fibre as claimed in claim 14 comprising means for applying the voltage to the layers.

16. The optical fibre as claimed in claim 10 when forming a part of an optical actuator.

17. The optical fibre as claimed in claim 10 when forming a part of an optical filter.

18. The optical fibre as claimed in claim 10 when forming a part of a tunable bandpass filter.

19. The optical fibre as claimed in claim 10 when forming a part of a fibre butt-coupler for coupling two fibres which may have different core and/or mode profile dimensions.

20. The optical fibre as claimed in claim 10 when forming a part of a part of a wavelength selective coupler.

21. The optical fibre as claimed in claim 10 when forming a part of a tunable wavelength selective coupler.

22. The optical fibre as claimed in claim 3 when forming a part of a device for remote Raman sensing.

23. The optical fibre as claimed in claim 3 when the lens is one of a plurality of lenses forming an array of lenses.

24. The optical fibre as claimed in claim 3 when combined with a graded refractive index (GRIN) lens.

25. The optical fibre as claimed in claim 1 when formed from a silica-based material doped with a refractive index-modifying dopant.

26. The optical fibre as claimed in claim 1 being formed from a polymeric material.

27. The optical fibre as claimed in claim 1 comprising a core region surrounded by the coaxial layers.

28. The optical fibre as claimed in claim 27 wherein the coaxial layers function as a cladding by having an average refractive index which is lower than the core refractive index.

29. The optical fibre as claimed in claim 1 wherein a refractive index-reducing dopant is included in the coaxial layers.

30. The optical fibre as claimed in claim 1 wherein the optical fibre is spliceable to a standard optical fibre.

31. An optical fibre being optically transmissive at a predetermined wavelength of light $\lambda$ and comprising a plurality of coaxial layers each having an optical path length that varies radially, the coaxial layers being arranged to give the fibre a refractive index profile which, in use, causes sufficient Fresnel diffraction of the light such that it is guided in the fibre;

wherein the optical fibre includes a lens and has an optical path length of each of the layers that increases gradually outwardly by substantially $n \times \lambda/2$ (n: integer), the layers being radially distributed, such that in use, the fibre effects sufficient Fresnel diffraction such that the light that is guided in the fibre and then passes out an end-face of the fibre, is focused substantially at a predetermined focal point.

* * * * *